(12) United States Patent
Glancy et al.

(10) Patent No.: US 9,492,751 B2
(45) Date of Patent: Nov. 15, 2016

(54) POP-UP BOOK GAMEPLAY MECHANICS

(75) Inventors: Neill Glancy, Austin, TX (US);
Michael Hadwin, Austin, TX (US)

(73) Assignee: Disney Enterprises, Inc., Burbank, CA (US)

( * ) Notice: Subject to any disclaimer, the term of this patent is extended or adjusted under 35 U.S.C. 154(b) by 711 days.

(21) Appl. No.: 12/871,737

(22) Filed: Aug. 30, 2010

(65) Prior Publication Data
US 2012/0052938 A1    Mar. 1, 2012

(51) Int. Cl.
*A63F 9/24* (2006.01)
*A63F 13/69* (2014.01)
*A63F 13/42* (2014.01)
*A63F 13/428* (2014.01)

(52) U.S. Cl.
CPC ............... *A63F 13/69* (2014.09); *A63F 13/42* (2014.09); *A63F 13/428* (2014.09)

(58) Field of Classification Search
CPC .......... A63F 9/24; A63F 13/00; A63F 13/06; A63F 13/10; A63F 13/20; A63F 13/42; A63F 13/428; A63F 13/52; G06F 17/00
USPC ............ 463/1–5, 7–9, 30–34, 36–43, 49–57; 273/108.1, 127 R, 148 R, 148 B, 309, 273/317.1, 340, 348, 361–367; 345/1.1–3.4, 156, 157, 160, 419, 345/473–475, 618–619, 629, 660–671; 348/37, 119, 141–142, 240.99, 348/E13.022–E13.027, E13.036; 434/115, 434/117, 118, 211; 715/706, 738, 757–759, 715/762–764, 766, 781–783, 788, 794–795, 715/798, 801–802, 807; 717/168–178; 375/240.15–240.16, 240.25
See application file for complete search history.

(56) References Cited

U.S. PATENT DOCUMENTS

| | | | | |
|---|---|---|---|---|
| 6,139,433 | A * | 10/2000 | Miyamoto et al. | ............. 463/32 |
| 6,913,536 | B2 * | 7/2005 | Tomizawa et al. | ............. 463/43 |
| 2004/0219976 | A1 * | 11/2004 | Campbell | ....................... 463/31 |
| 2010/0315352 | A1 * | 12/2010 | Hamamura et al. | .......... 345/173 |

OTHER PUBLICATIONS

Overhazard, New Super Mario Bros. Wii Mini Run—7-4, YouTube (Jan. 14, 2010) http://www.youtube.com/watch?v=j-uxLuwA-LE ("New Super Mario").*
Lucas M. Thomas, Paper Mario Review, IGN (Jul. 20, 2007), http://www.ign.com/articles/2007/07/21/paper-mario-review ("Paper Mario").*
Arron, First Ever 3D Pop-Up Book for iPad. Dropping Dec. 2010 [Trailer], RazorianFly (May 23, 2010) http://www.razorianfly.com/2010/05/23/first-ever-3d-pop-up-book-for-ipad-dropping-december-2010-trailer/.*
David Dahlquist, Alice for the iPad brings pop-up books into the 21st century, Macworld (Apr. 13, 2010) http://www.macworld.com/article/1150578/alice_ipad.html.*
Greg Walsh, Pop Up Game (Nov. 18, 2008), https://www.youtube.com/watch?v=OpnYbG-Eoq8.*

(Continued)

*Primary Examiner* — Lawrence Galka
(74) *Attorney, Agent, or Firm* — Patterson + Sheridan LLP

(57) ABSTRACT

Method, article and apparatus for executing computer games, and in particular, computer-based platform games. In a platform game, a user may interact directly with and articulate pop-up book elements to modify the game level. The modified game level may be navigable by a game character also controlled by the user.

27 Claims, 14 Drawing Sheets

(56) References Cited

OTHER PUBLICATIONS

Greg Walsh, Hauten Ruins Pop Up Game, (Nov. 14, 2008), https://www.youtube.com/watch?v=1W8Jqf1Ezr4.*

Ryoko, Welcome to the Amazing World of Pop-Up Books (Nov. 27, 2006), http://pingmag.jp/2006/11/27/pop-up-books/.*

UnBoxingBoardGames, UnBoxing: Treasure of the Lost Pyramid (Aug. 10, 2010), https://www.youtube.com/watch?v=zxdkTFXL1LU.*

"The Incredible Machine (series)". From Wikipedia, The Free Encylopedia. [online], [retrieved on Jan. 26, 2016]. Retrieved from the Internet <URL:http://en.wikipedia.org/wiki/The_Incredible_Machine_(series)>. 5 pages.*

"Return of the Incredible Machine Contraptions Walkthrough: Tutorial Levels 1-50", [dated Oct. 14, 2013]. [online], [retrieved Jan. 26, 2016]. Retrieved from the Internet <URL:http://www.youtube.com/watch?v=oTD5wfz39gl>. 1 page.*

* cited by examiner

POP-UP BOOK GAMEPLAY MECHANICS

BACKGROUND

Field

The invention is directed to computer games, and in particular, to computer-based platform games.

Description of the Related Art

Platform games are a popular genre in the computer gaming world. These games generally include a player navigating a game character through a predefined level to reach an end goal. The player typically may control the game character using an input device, such as a joystick-type controller. The player, through the game character, typically must navigate a plurality of obstacles, suspended platforms and physical puzzles using a set of actions such as jumping, running, and climbing. For example, the game character may interact with various elements contained within the level, including leaping on platforms, jumping on switches, striking boxes, and climbing up ropes.

SUMMARY

One embodiment of the invention provides a computer implemented method for executing a video game. The method may include receiving a selection input indicating a pop-up element in a predetermined game level has been selected and receiving a movement input indicating a direction and speed by which to articulate the pop-up element. The method may further include modifying, in response to at least one of the inputs, the game level and the pop-up element based on the inputs, wherein the modified game level and pop-up element are interactive with a user-controlled game character participating in the video game.

Another embodiment of the invention provides a computer readable storage medium comprising a program product which, when executed, is configured to perform an operation to execute a video game. The operation may include receiving a selection input indicating a pop-up element in a predetermined game level has been selected and receiving a movement input indicating a direction and speed by which to articulate the pop-up element. The operation may further include, in response to at least one of the inputs, modifying the game level and the pop-up element based on the inputs, wherein the modified game level and pop-up element are interactive with a user-controlled game character participating in the video game.

Another embodiment of the invention provides a system, comprising a memory device comprising a video game and a processor for executing the platform video game. The processor may be configured to receive a selection input indicating a pop-up element in a predetermined game level has been selected and receive a movement input indicating a direction and speed by which to articulate the pop-up element. The processor may further be configured to, in response to at least one of the inputs, modify the game level and the pop-up element based on the inputs, wherein the modified game level and pop-up element are interactive with a user-controlled game character participating in the video game.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
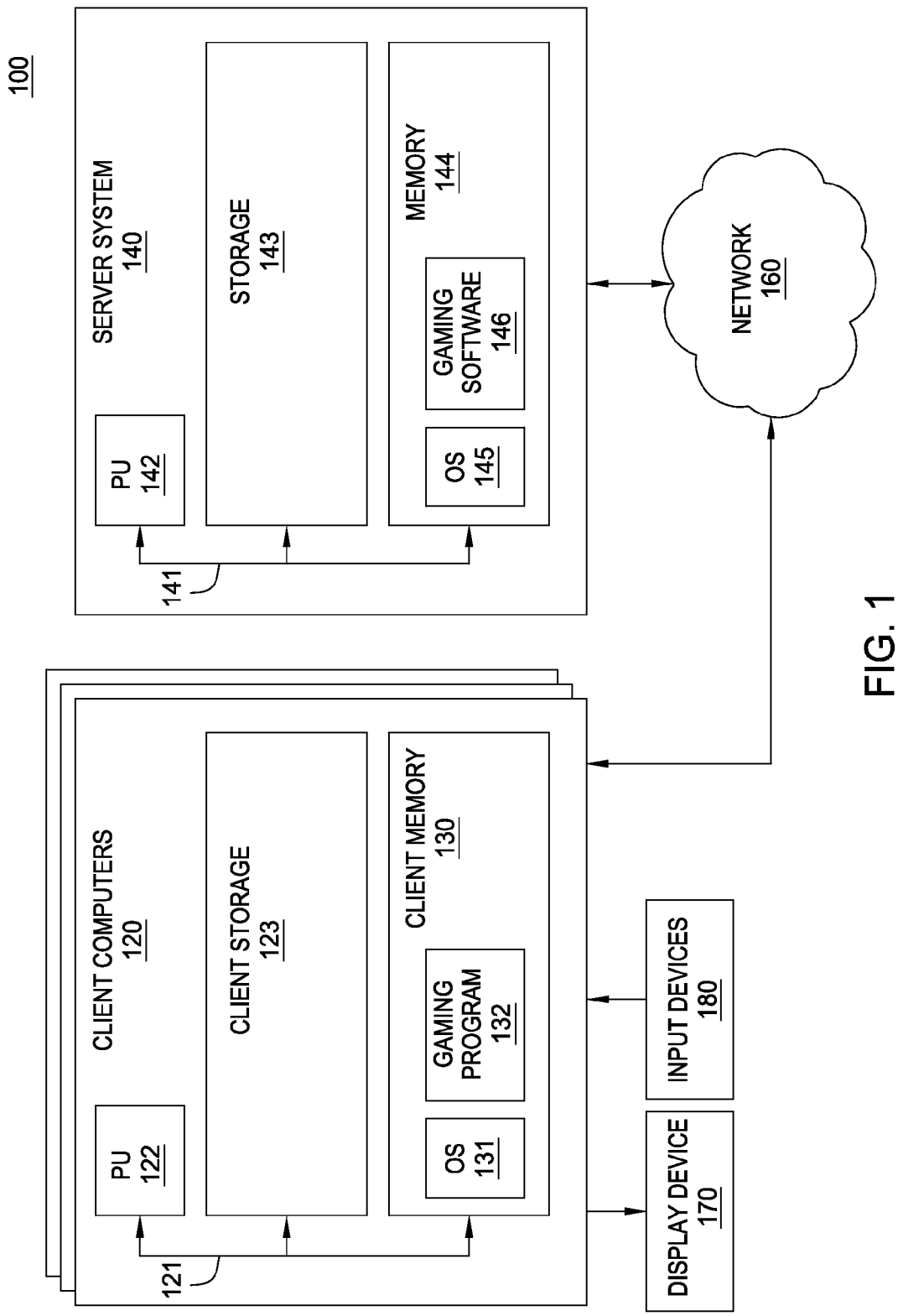
FIG. 1 illustrates an exemplary system according to an embodiment of the invention.

Embodiments of the present invention are directed to computer games, and in particular to computer-based platform games. In one embodiment, a game character navigates a game level that may include a game environment having elements evocative of a physical pop-up book.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a block diagram illustrates a client-server view of a computing environment 100, according to one embodiment of the invention. As shown, computing environment 100 includes client computers 120, a network 160 and a server system 140. In one embodiment, the environment 100 may include existing computer systems, e.g., desktop computers, server computers, laptop computers, tablet computers and the like. The computing environment 100 illustrated in FIG. 1, however, is merely an example of one computing environment. Embodiments of the present invention may be implemented differently, regardless of whether the computer systems are complex multi-user computing systems, such as a cluster of individual computers connected by a high-speed network, single-user workstations or network appliances lacking non-volatile storage. Further, while FIG. 1 illustrates a client-server model, other models are contemplated such as a peer-to-peer model.

As shown, each client computer 120 includes a processing unit 122, which obtains instructions and data via a bus 121 from a client memory 130 and client storage 123. Processing unit 122 is a programmable logic device that performs instruction, logic and mathematical processing, and may be representative of one or more CPUs and/or GPUs. Client storage 123 stores application programs and data for use by client computer 120.

The memory 130 is any memory sufficiently large to hold the necessary programs and data structures. Memory 130 could be one or a combination of memory devices, including Random Access Memory, nonvolatile or backup memory (e.g., programmable or Flash memories, read-only memories, etc.). In addition, memory 130 and storage 123 may be considered to include memory physically located elsewhere; for example, on another computer coupled to the client computer 120 via bus 121.

Client storage 123 includes hard-disk drives, flash memory devices, optical media and the like. Client computer 120 is operably connected to the network 160. Client memory 130 includes an operating system (OS) 131 and a gaming program 132. Operating system 131 is the software used for managing the operation of the client computer 120. Examples of OS 131 include UNIX, a version of the Microsoft Windows® operating system, and distributions of the Linux® operating system.

In one embodiment, each client is a dedicated gaming console, such as a Sony PS3®, Nintendo Wii® or Xbox 360®, capable of executing the gaming program 132. In another embodiment, each client is a general purpose computer configured to run any variety of gaming and non-gaming software. The game may be viewed on a display device 170, such as an LCD, LED or CRT monitor display, and controlled using input devices 180 which may be, e.g., a keyboard, mouse and/or a controller.

As shown, the server system 140 includes the same basic hardware elements as the client computers 120. Specifically, the server system 140 includes a processing unit 142 (representative of one or more CPUs and/or GPUs), a memory 144 and storage 143 connected via a bus 141. The server system 140 may be operably connected to the network 160, which generally represents any kind of data communications network. Accordingly, the network 160 may represent both local and wide area networks, including the Internet. In one embodiment, the server system 140 hosts an on-line gaming environment to which one or more of the client computers 120 connect. In this case, server-side gaming software 146 may be located in memory 144 of the server system 140 and cooperates with client-side gaming software (e.g., game program 132) located on the respective client computers 120.

The following embodiments of the invention are described with reference to a platform game in which a game character may navigate a game level to reach a predetermined end point. In one embodiment, the game software (e.g., game program 132), wherever located, is a platform video game that allows one or more users to control a game character using a controller. The video game includes predefined game levels having game elements evocative of a pop-up book. In one embodiment, the elements may have a three-dimensional appearance suggesting that a player may directly physically manipulate them. The player may use a pointing controller to point at and select the pop-up element with the level. The player may then use the pointing controller to perform a movement gesture as if to directly manipulate the pop-up element. In response to the selection and movement, the platform game modifies the game environment according to the manipulation of the pop-up element. The game character may then interact with the modified game environment to further navigate the game level.

Figure 2:
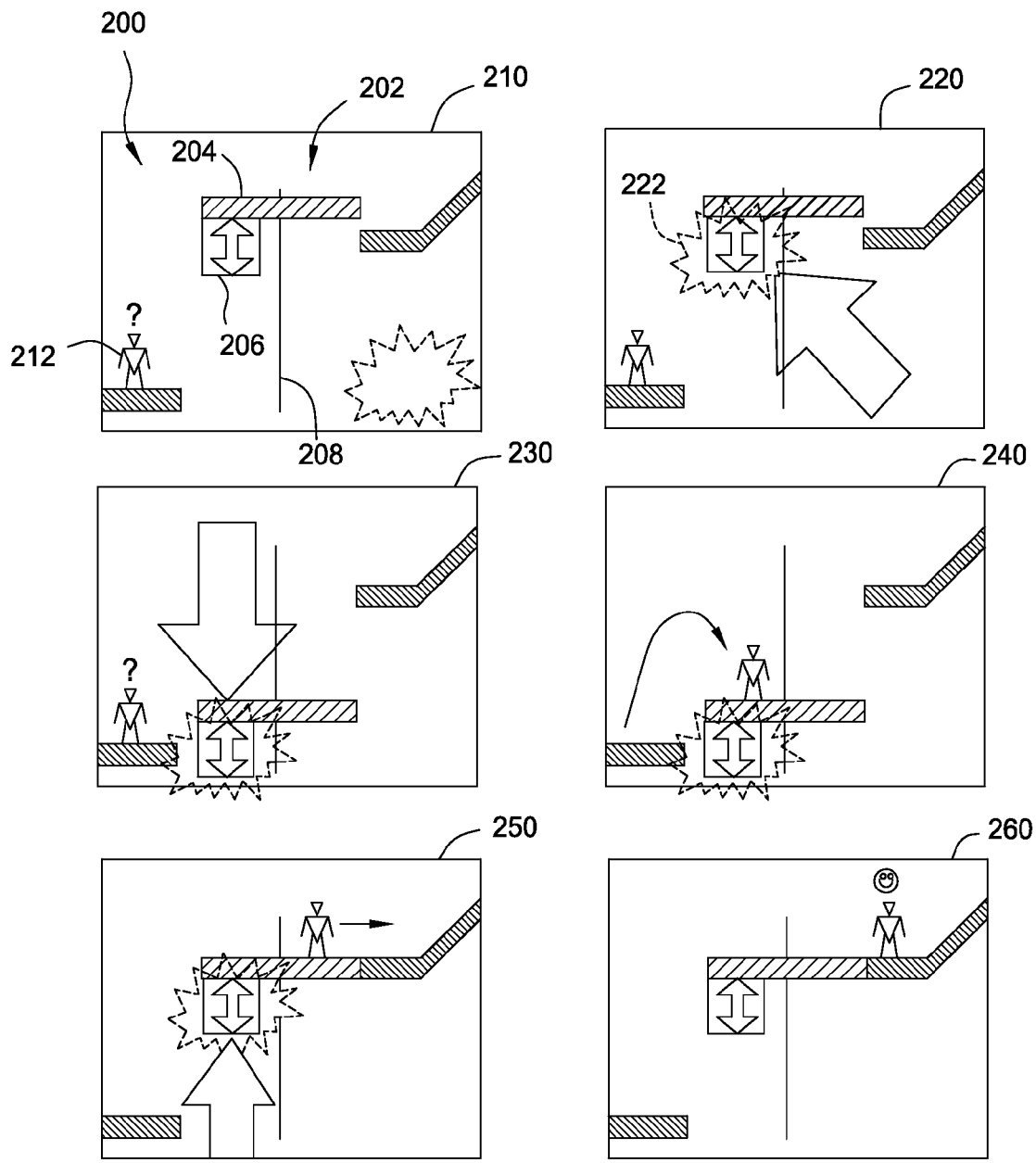
FIG. 2 is a sequential diagram illustrating an exemplary game level according to an embodiment of the invention.

FIG. 2 illustrates a sequential diagram of an exemplary game level 200 according to an embodiment of the invention. The game level 200 may have the appearance of a three-dimensional pop-up book having interactive features. As illustrated in FIG. 2, the game level 200 may include a pop-up element 202. In this example, the pop-up element 202 generally includes a platform 204, a tab 206 and an articulation groove 208. The tab 206 generally has a three-dimensional appearance suggesting the tab is graspable. The tab 206 may have signage suggesting a direction of movement. For example, the tab may include an up-down arrow suggesting the pop-up element may be articulated upwards and downwards. The articulation groove 208 suggests the path the platform 204 may take when moved by the user. As shown in FIG. 1, the articulation groove 208 is a vertical line through the platform, indicating that the pop-up element 202 may be articulated upwards and downwards.

At 210, a game character 212 may reach a point in the game level where the game character is unable to navigate a game element, which may be a pop-up element 202. For example, the game character 212 may reach a point where a next platform is too high and too far to reach with a normal jump action.

At 220, a user may use a pointing controller to "reach" into the game level 200 to select the tab 206. The pointer position is indicated with a star 222 in FIG. 2. The user may select the tab 26 by pointing the controller at the tab 206, and pressing and/or holding a button on the controller. The tab 206 may change appearance or display an animated sequence upon selection.

At 230, the user may use the controller to pull the tab 206 to a new location, causing the platform 204 to move along with the tab 206. The user may perform a movement gesture with the controller, while selecting the tab. For example, the user may perform a downward motion with the controller to indicate to the game to articulate the game element downward. The platform element may now be in a position navigable by the game character 212.

At 240, the user may control the game character 212 to jump onto the relocated platform. At 250, the user may select the tab 206 again to manipulate the platform 204 upwards. At 260, the user may control the game character to continue through the game level, having navigated a game element that was un-navigable without direct intervention using the pop-up elements.

Figure 3:
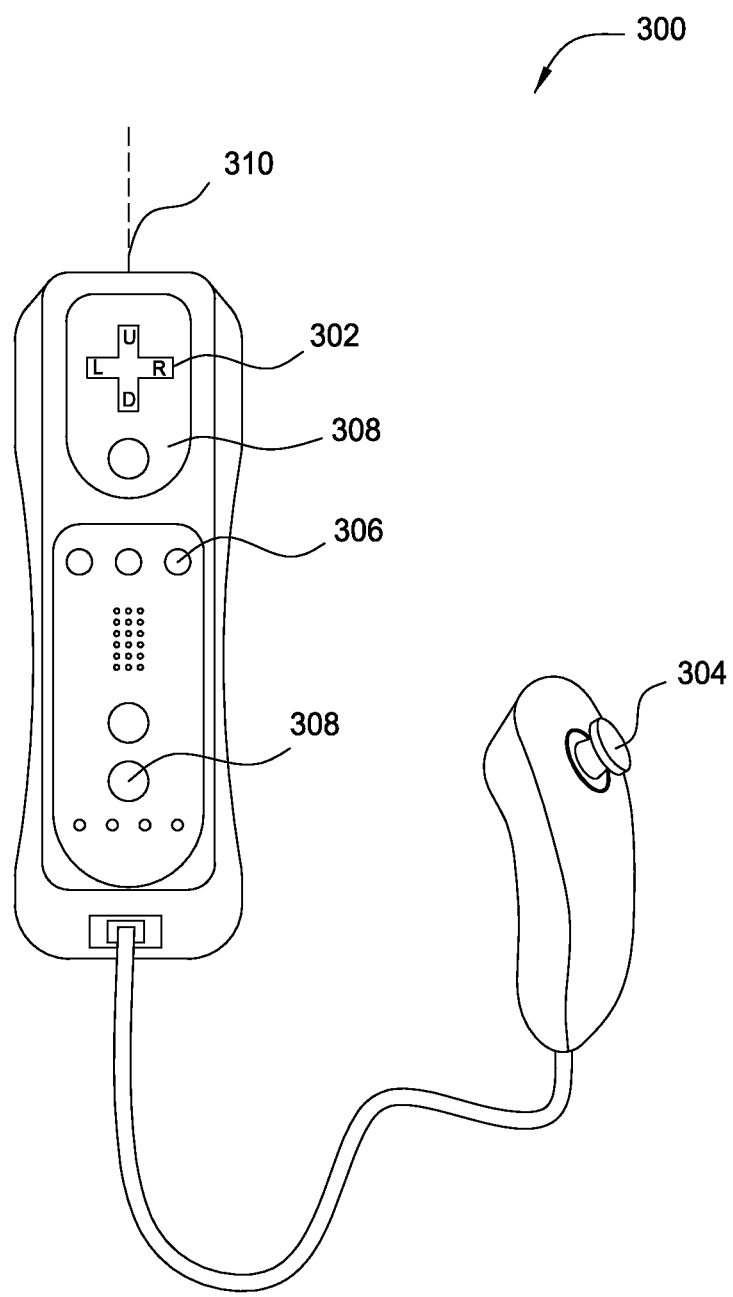
FIG. 3 illustrates an exemplary input device that may be used with the exemplary system of FIG. 1.

Manipulating pop-up book elements and controlling a game character may involve using a game controller. FIG. 3 illustrates an exemplary controller 300 according to an embodiment of the invention. The controller 300 is shown as a rectangular device in FIG. 3. However, in alternative embodiments, the controller 300 may have any reasonable shape. For example, in some embodiments, the controller may be ergonomically shaped to facilitate gripping with human hands. The controller 300 may be a wired or a wireless controller configured to connect with a client computer 120. In one embodiment, the controller may be a joystick-based controller comprising one or more directional pads or joysticks and one or more buttons. In another embodiment, the controller may be a pointing wand. Examples of input device 180 include a Nintendo Wii-mote®.

In general, the controller 300 may include one or more buttons, joysticks, switches, trackballs and the like. For example, as illustrated in FIG. 3, the controller 31 may include a direction pad 302, one or more joysticks 304, a start button 306 and one or more functional buttons 308. The start button 306 may be configured to power the controller 300. If the controller 300 is a wireless controller, pressing the start button 306 may cause the controller to establish a wireless connection with a respective client computer 120.

The direction pad 302 may include a plurality directional buttons, e.g., up (U), down (D), left (L), and right (R), as illustrated in FIG. 3. In one embodiment, the direction pad 310 may be used to control the game character in a platform game. For example, the left (L) and right (R) buttons may be used to move a game character laterally across the game level, the up button (U) may be used to cause the game character to jump and/or climb upwards, and the down button (D) may be used for causing the game character to slide and/or crouch. In one embodiment, an alternative joystick 304 may also be used to control the game character. For example, an upward push of the joystick corresponds to pressing the up button.

At least one of the functional buttons 308 may be used by a user to control the game character's set of actions. For example, in one embodiment, pressing a functional button 308 may cause the game character to jump. In some embodiments, pressing a functional button 308 may correspond to a generic "interact" action by the game character whose function corresponds to different contexts. For example, the "interact" action to grab an item, when near an item, or to actuate a switch when near a switch, or use an item from an inventory of items.]

At least one of the functional buttons 308 may also be used by a user in conjunction with the signal emitting components 310 (described below) to select a game element. For example, a user may point the controller at a game screen and press and/or hold a functional button 308 to indicate a selection of the game element pointed at.

The controller 300 may further include one or more sensors (not shown) for detecting changes in movement and orientation, and one or more signal emitting components 310 for pointing. The movement and orientation sensors are capable of detecting changes in horizontal and vertical orientation and changes in pitch and awe. The movement and orientation sensors may be further capable of detecting an acceleration of the controller 300. For example, if the controller 300 is swung like a baseball bat, the movement and orientation sensors may detect the speed of the swing, the angle at which the swing is made, and orientation of the controller during the swing The signal emitting components 310 may be configured to direct a signal at a receiver indicating a direction at which the controller 300 is being pointed at. The receiver (not shown) may be configured to receive the signal and determine as coordinate and position which the controller is pointed. For example, the controller 300 may be pointed at a target displayed on a video screen. A nearby receiver detects the position pointed to by the controller 300 and relays that position to the video game system.

The controller 300 is shown in FIG. 3 for illustrative purposes only and are not limiting on the invention. Any reasonable type and shape of controller, for example, key pads, key boards, mouse, trackballs, and the like may be used in alternative embodiments to play the platform game, as disclosed herein. In some embodiments, the platform game may be played in a controller-free environment. In such embodiments, the gaming system, e.g., client 120, may be configured to detect gestures of one or more players, wherein the gestures may be used to manipulate the pop-up elements and control the game character in the platform game.

It is acknowledged that with respect to the pop-up game elements described herein, language such as "select," "grab," "grasp," "hold," "point," "take," and similar words may be used with respect to the action of pointing a pointing controller at a desired pop-up game element and pressing and/or holding a functional button on the controller to signal a selection. It is further acknowledged that language such as "pull," "push," "yank," "twist," "pivot," "slide," "twirl," "spin," "swing," "turns," "tug," "nudge," and similar words may be used with respect to performing a movement gesture with the pointing controller while selecting a pop-up game element to suggest a manner in which to articulate the selected pop-up game element. "User" and "player" are considered synonymous and interchangeable, whereas "game character" refers to a virtual game figure or virtual character representing the player within the game level. Where game characters are described to "jump," "climb," or perform any action, it is assumed that the user or player is controlling that game character to perform that action.

Figure 4:
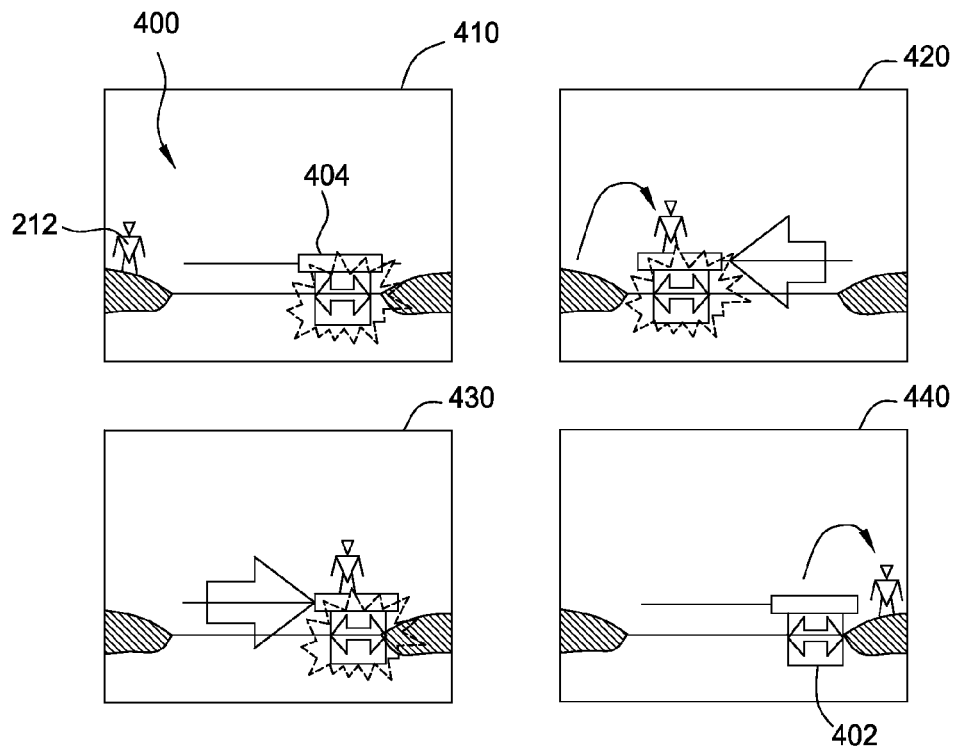
FIG. 4 is a sequential diagram illustrating an exemplary game level according to another embodiment of the invention.

FIG. 4 illustrates a sequential diagram of another exemplary game level 400 according to one embodiment of the invention. At 310, a game character 212 has reached a point in the game level 400 wherein the game character 212 is unable to cross a river. A user may select and grasp a tab attached to a platform 404. At 420, the user may pull the platform across and close to the game character, wherein the game character may then jump onto the platform 404. At 430, the user may then re-grasp the tab to pull the tab and platform 404 over to the opposite bank of the river. At 440, the game character may jump off the platform 404 and continue to navigate the game level 400.

Figure 5:
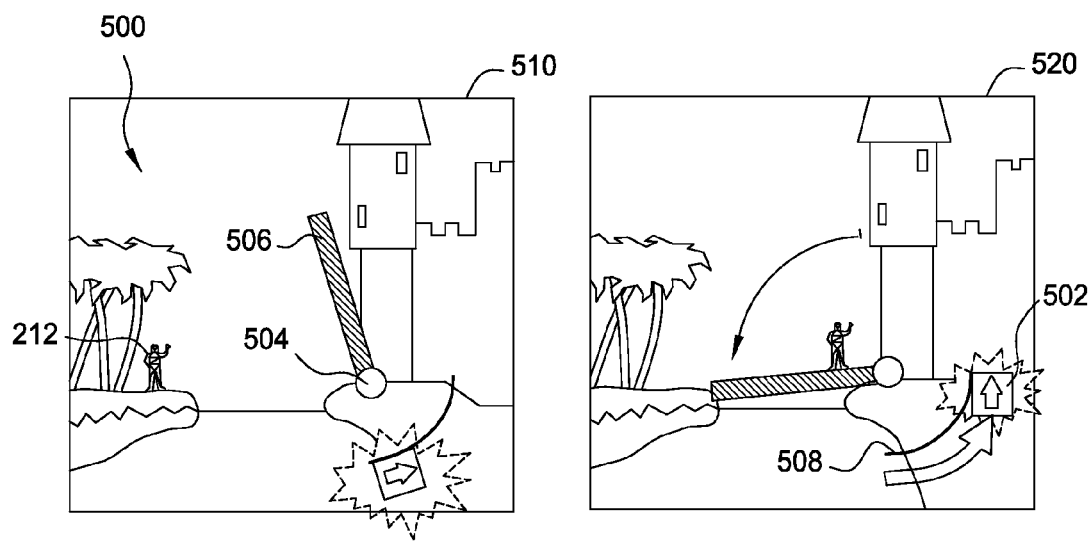
FIG. 5 is a sequential diagram illustrating an exemplary game level according to an alternative embodiment of the invention.

It is acknowledged that the tab need not be attached directly to the platform or the game element to be articulated. For example, as illustrated in FIG. 5, the game character is at a point in the game level 500 where the game character is unable to cross using game character actions alone. At 510, the user may select the tab placed proximate a pivot point 504 of a drawbridge feature 506. At 520, the user may pull and pivot the tab along an articulation groove 508. The articulation of the tab causes the drawbridge 506 to rotate down towards the game character. As such, the game character may then jump onto the drawbridge and continue to navigate the game level.

Figure 6:
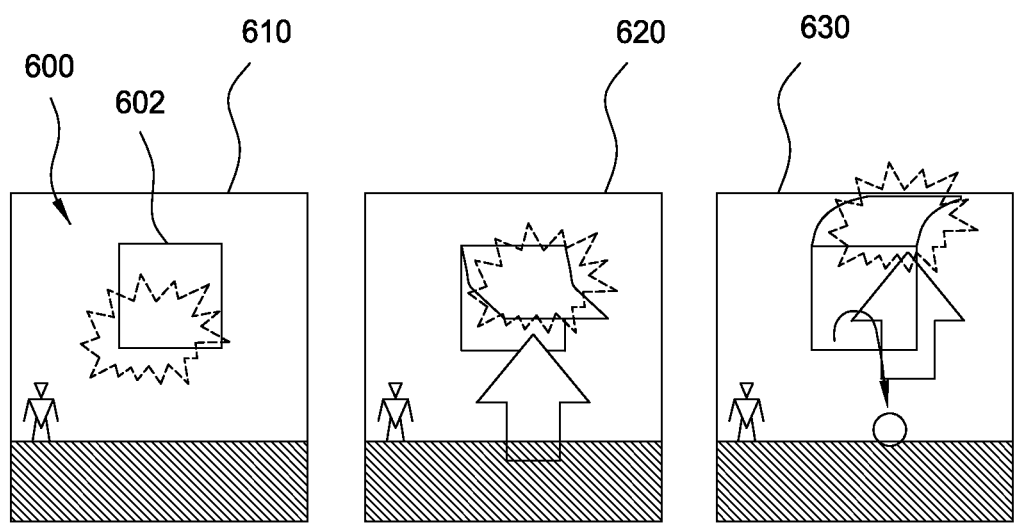
FIG. 6 is a sequential diagram illustrating an exemplary game level according to an embodiment of the invention.

In another embodiment, as illustrated in FIG. 6, a pop-up element may be a hidden "flap" which, when selected and manipulated by a user, may open to reveal items, such as power-ups, gold coins or even surprise enemy characters. At 610, the user may encounter a flap 602. The flap 602 may be hidden and may only be revealed using a pointer controller. A user may use the pointer controller to pass the pointer over the flap 602. When the pointer passes over the flap 602, the game may generate a feedback indicating a flap 602 has been found. For example, the pointer controller may vibrate, or the flap may shimmer, or generate another tell which shows the flap position more clearly to the user. At 620, the user may press a button on the controller, such as an "interact" button, followed by a flicking the controller upward to pop the tab 602 open. At 630, the tab may open to produce an item 606. The produced item 606 may be a treasure item, a power-up, or even surprise enemy characters. The produced item may be predetermined or may be randomly selected from a range of possible items.

Figure 7:
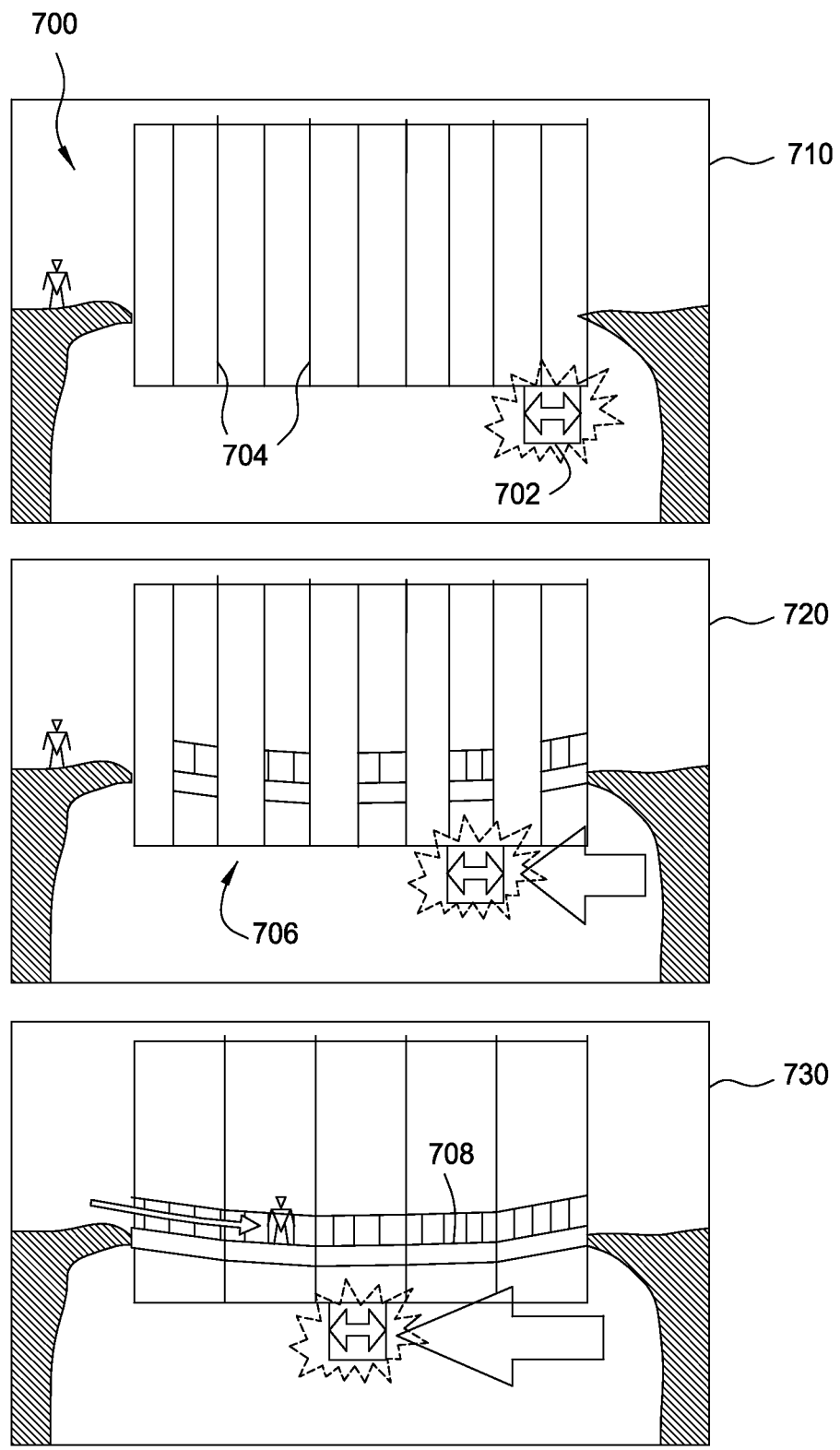
FIG. 7 is a sequential diagram illustrating an exemplary game level according to an embodiment of the invention.

In yet another embodiment illustrated in FIG. 7, a pop-up element may comprise a tab 702 which, when selected and manipulated by a user, may reveal additional game elements with a "shutter-like" effect. At 710, a game character may come across a large chasm. The game character is unable to cross it by jumping because the chasm is far too long. The user may grab the tab 702 to reveal an image underneath folds 704. At 720, the user may slide the tab laterally. A transition-effect may be observed as the game level changes to reveal additional elements. In this example, the shutter 706 reveals a bridge 708. At 730, the transition effect is completed and the user has produced a bridge 708. The game character may walk across the bridge and cross the chasm safely. It is acknowledged that the tab may be reversed and the bridge may be shuttered away, for example, to prevent enemies from following the game character.

Figure 8:
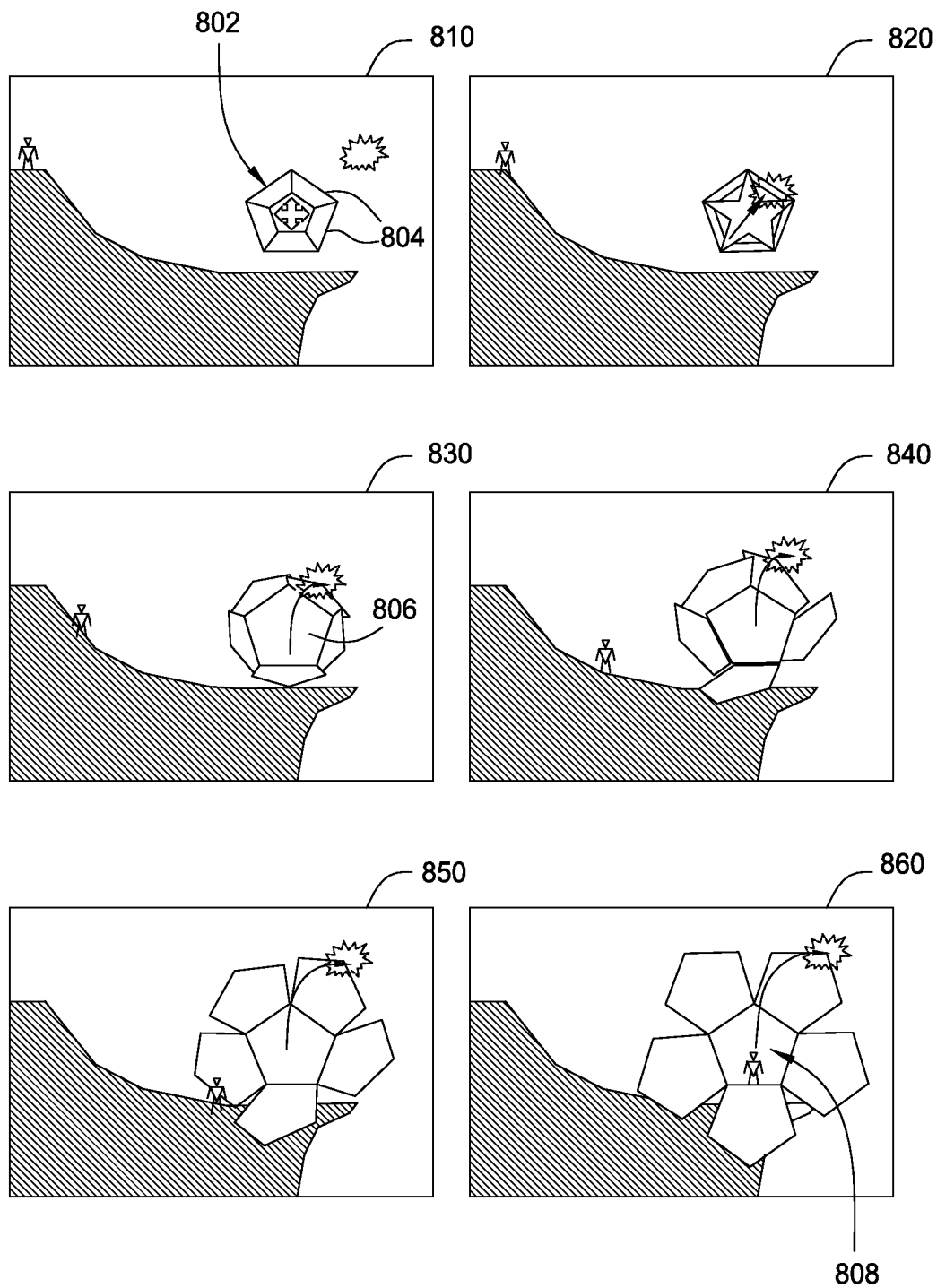
FIG. 8 is a sequential diagram illustrating an exemplary game level according to an embodiment of the invention.

In still another embodiment illustrated in FIG. 8, a pop-up element may comprise a folded "flower" 802 comprising petals 804 which may be selected and unfolded by the user. Upon unfolding the petals 804, the flower may provide a teleportation port for game characters. As illustrated in FIG. 8, at 820, the user encounters a folded paper "flower" 802. The flower 802 comprises one or more petal elements 804 circumscribing the flower 802. At 820, 830, 840, 850, the user may use the pointer controller to manipulate and unfold each petal element in the arcuate manner subscribed by the arrow 806. At 860, each petal element 804 of the flower 802 has been unfolded to reveal a transportation gate 808. The game character may jump inside to teleport to a different location. Upon doing so, the game may display an animation comprising the flower closing and the player teleporting to a new location.

Figure 9:
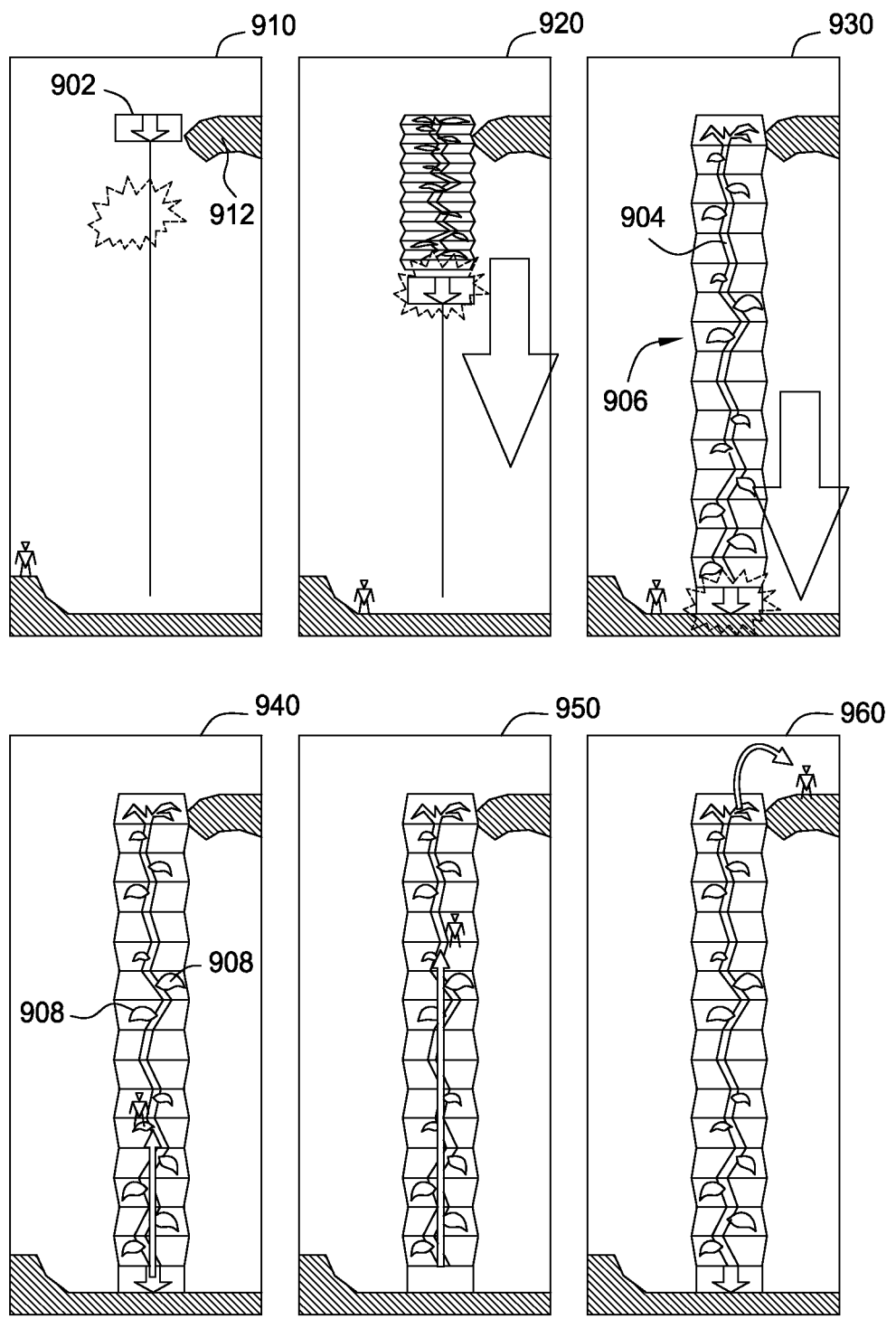
FIG. 9 is a sequential diagram illustrating an exemplary game level according to an embodiment of the invention.

In another embodiment as illustrated in FIG. 9, a pop-up element may comprise an "accordion"-like element which, when selected and manipulated by a user, may be expanded to reveal a pathway for game characters. At 910, the game character may reach a point in the game level wherein the next platform 912 is at an unreachable point above the game character. The user may grab the tab 902. At 920, 930, the user may pull the tab 902 downward to reveal an expandable pathway 904. The expandable pathway 904 may have the three-dimensional appearance of a "concertina" or an accordion 906 that may expand to reveal the pathway or compress to hide the pathway. The expandable pathway 904 may comprise additional platform elements 908 which a game character may interact with and navigate. At 940, 950, 960, the game character climbs up the expanded pathway 904 with a series of jumps to reach the previously unreachable high platform 912.

The pop-up element may also be a wheel element which a user may rotate by selecting and manipulating the wheel at a point along the circumference of the wheel. This property has a number of applications as described below.

Figure 10:
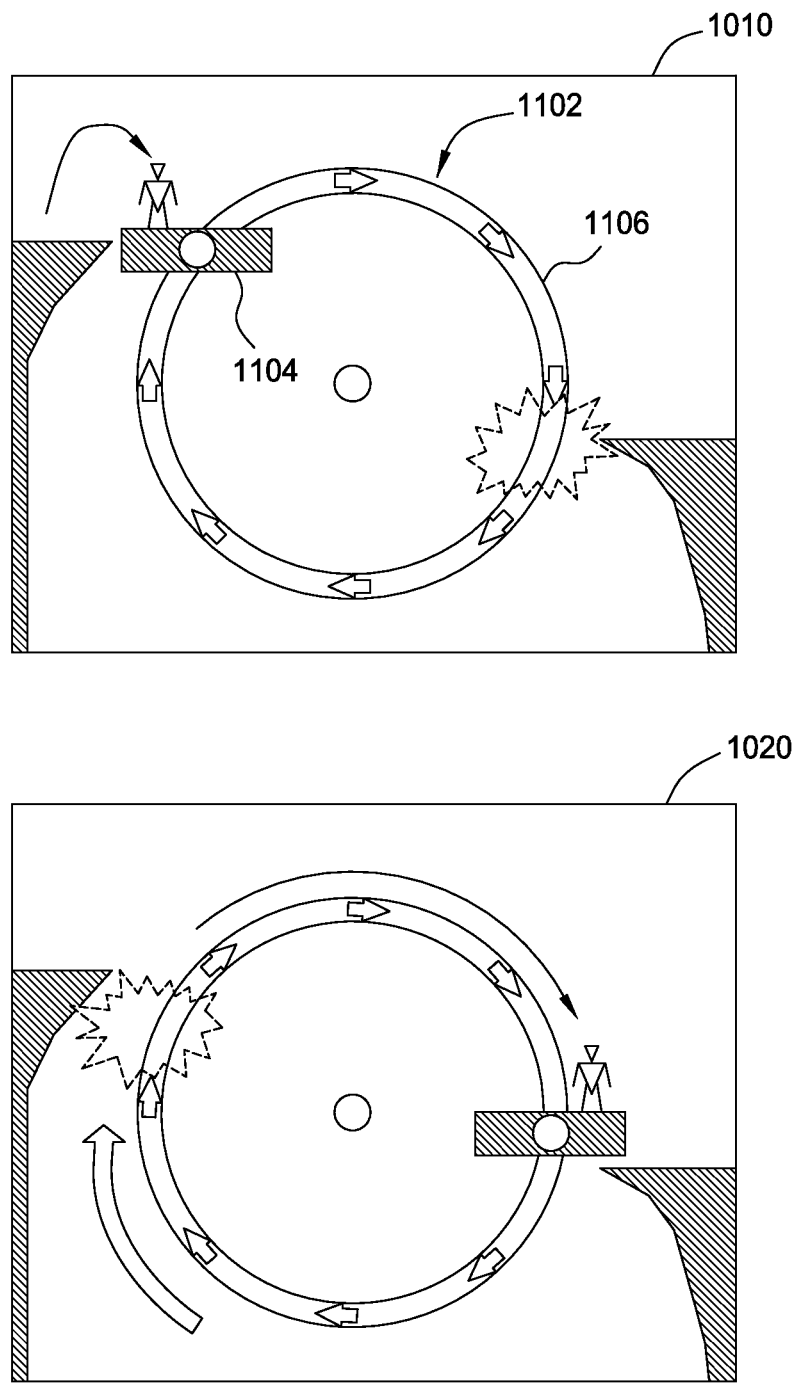
FIG. 10 is a sequential diagram illustrating an exemplary game level according to an embodiment of the invention.

FIG. 10 illustrates a sequential diagram of an exemplary game level having a pop-up wheel 1002. As shown, the pop-up wheel 1002 may be rotatable and may comprise platform elements 1004 affixed to the pop-up wheel, the platforms rotating along with the wheel. At 1010, the game character reaches a point across a chasm that is un-navigable using jumps alone. The game character may jump onto one of the platform elements. The user may grasp the edge 1006 of the wheel. At 1020, the user may swing the pointer controller in a circular motion to cause the wheel to turn. This causes the platform 1004 to move around the wheel's circumference like a Ferris wheel. The platform 1004 reaches a point proximate to the opposite side of the chasm. The game character may jump off the platform and onto the opposite side of the chasm, and may continue to further navigate the game level.

Figure 11:
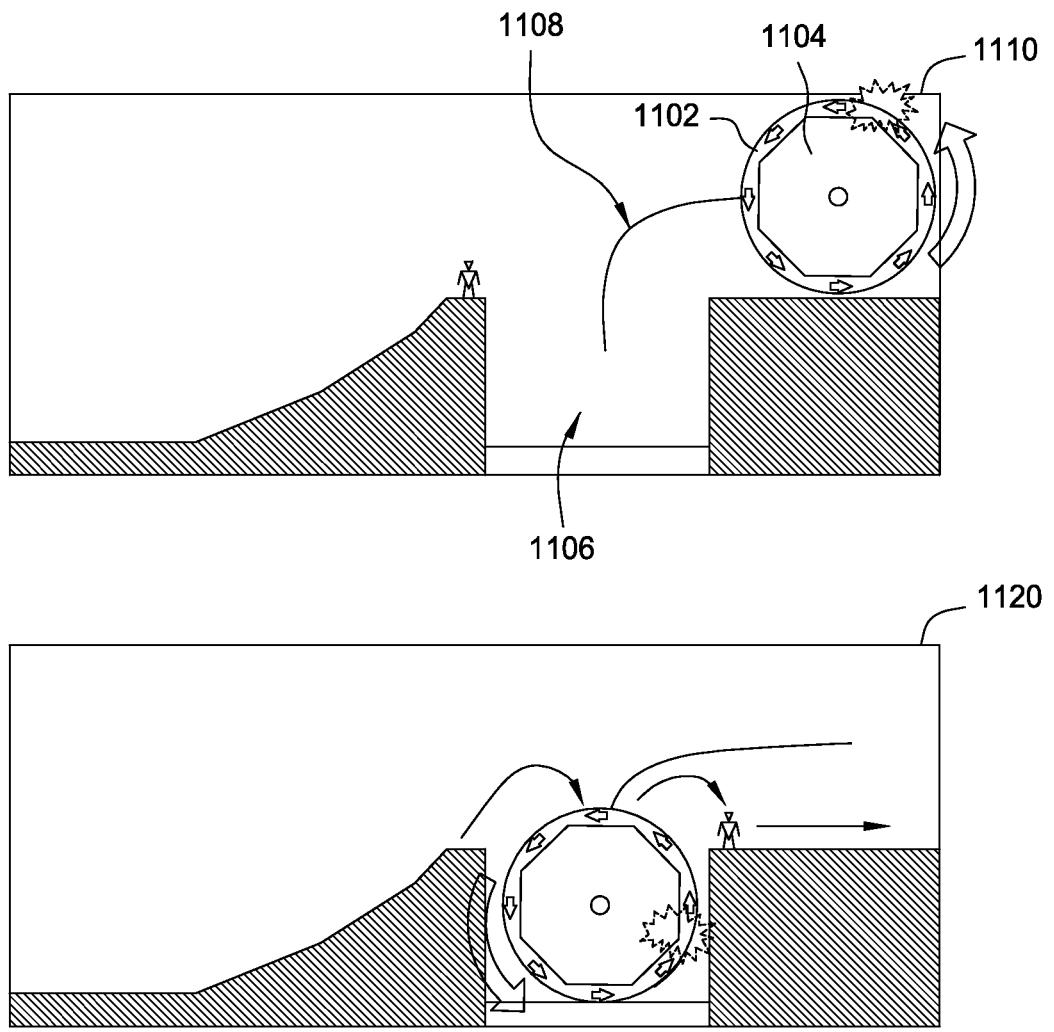
FIG. 11 is a sequential diagram illustrating an exemplary game level according to an embodiment of the invention.

FIG. 11 illustrates another scenario for a pop-up element. In this example, a pop-up wheel 1102 may also be coupled to a game object such as a boulder 1104 which may rotate and translate as the wheel "rolls." As shown at 1110, the game character may encounter a large un-navigable pit 1106. Proximate to the pit is a rotary pop-up wheel element 1102 with a boulder 1104 painted on its surface. The user may grasp the edge of the wheel and begin to spin it. At 1104, as the user turns the wheel, the wheel element rolls along an articulation groove 1108. The user may continue to turn the wheel until the boulder 1104 descends into the pit 1106 and occupies the pit 1106. The game character may now jump onto the boulder 1104 to cross the pit 1106 and further navigate the game level.

Figure 12:
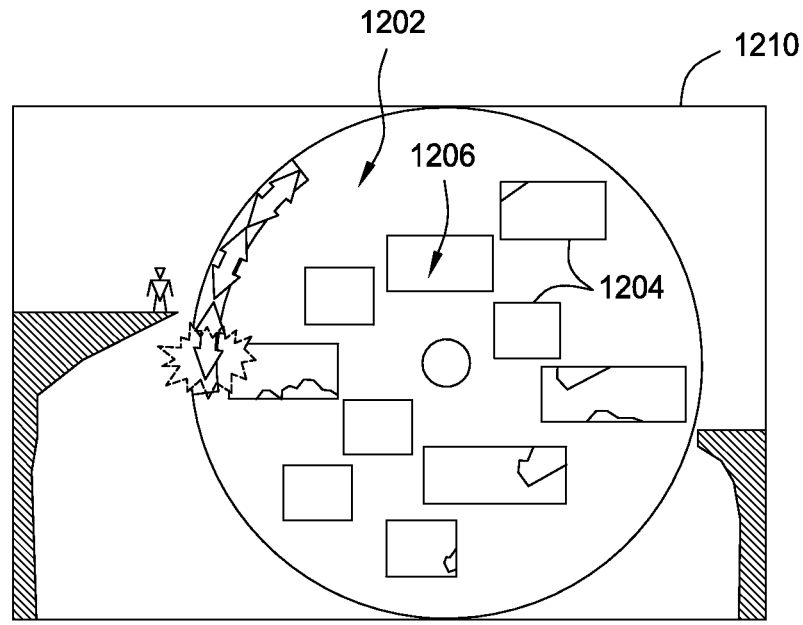
FIG. 12 is a sequential diagram illustrating an exemplary game level according to an embodiment of the invention.
Figure 12:
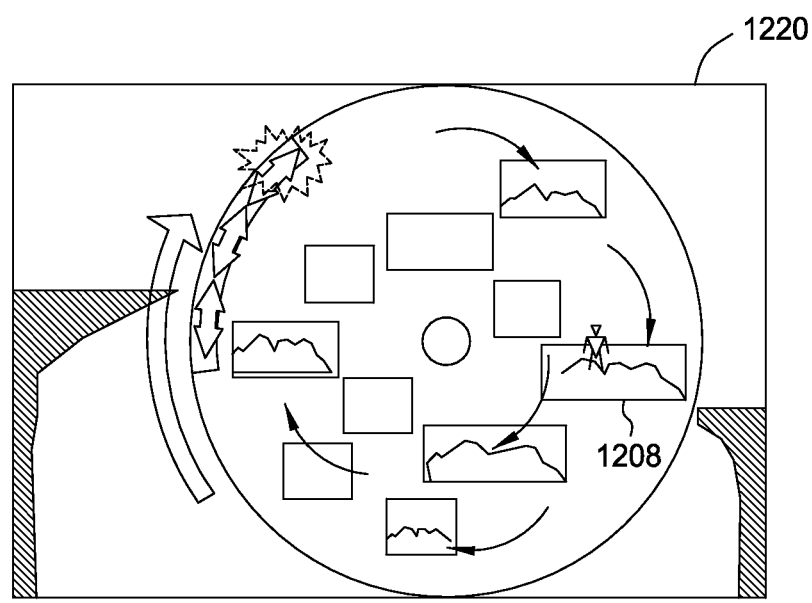

FIG. 12 illustrates another embodiment of the wheel element. As shown, a pop-up wheel 1202 may be a "codex" mechanism which includes one or more windows 1204 cut-out from the wheel 1202, exposing an underlying layer 1206 and/or secret choices. Rotating the wheel 1202 relative to the underlying layer 1206 reveals game elements such as hidden platforms or information. As illustrated in FIG. 12, at 1202, the game character may reach an un-navigable chasm. The user may encounter only a small part of an exposed rotary wheel 1202. The codex element may comprise one or more cut-out windows 1204. At 1220, the user may turn the exposed wheel 1202 and an underlying layer 1206 of platforms and/or other information moves relative to the cut-out windows, revealing themselves. The user may continue to articulate and rotate the wheel 1202 to select a platform configuration of their choice and/or to gain other information via this codex element. The game character may then cross the chasm safely using revealed platforms 1208.

Figure 13:
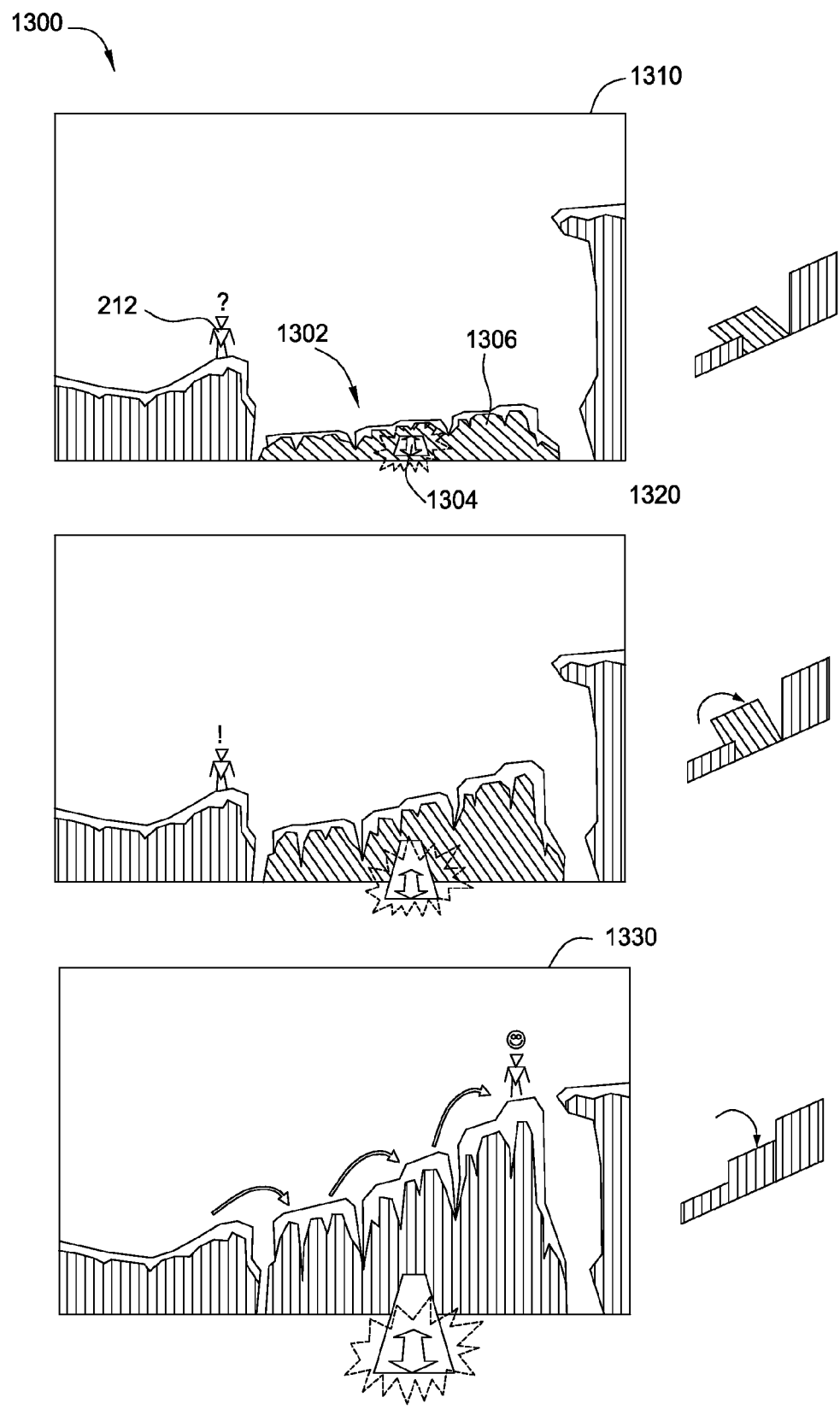
FIG. 13 is a sequential diagram illustrating an exemplary game level according to an embodiment of the invention.

In another embodiment, as illustrated in FIG. 13, a pop-up element 1302, when selected and manipulated by a user, may cause a portion of the game level 1300 to stand up or fall-down. The pop-up element 1302 may include a "pull-up" tab 1304 and a pop-up card 1306. The pop-up card 1306 may have a three-dimensional appearance of an object laying flat down within the game level 1300. The pop-up card 1306 may be attached behind the tab 1304. At 1310, a game character 212 may reach a large chasm or other obstacle. The user may grab the tab 1304 with the pointing controller. At 1320, the user may yank or pull the pointing controller towards themselves. In one embodiment, this movement gesture may be described as pulling a rope towards oneself. As the user pulls the tab, the pop-up card 1306 stands up. The pop-up card 1306 may display a transition having a three-dimensional appearance of standing up from a previously flat orientation. In one embodiment, the tab 1304 may have an elongated appearance as if it is being pulled out of the game level 1300, normal to the game screen. At 1330, having raised the pop-up card 1306, the game character may interact with the pop-up card 1306 to cross a portion of the game level 1300. In one embodiment, the game character 1312 may jump on top of the pop-up card 1306 and cross the chasm. It is acknowledged that pull-up tab 1304 may be reversed, causing the pop-up card to fall down. It is further acknowledged that the corresponding movement gestures may be reversed. In other words, in one embodiment, the pull-up tab may be configured to lower a portion of the game level when the tab is pulled, and raise a portion of the game level when the tab is pushed.

Figure 14:
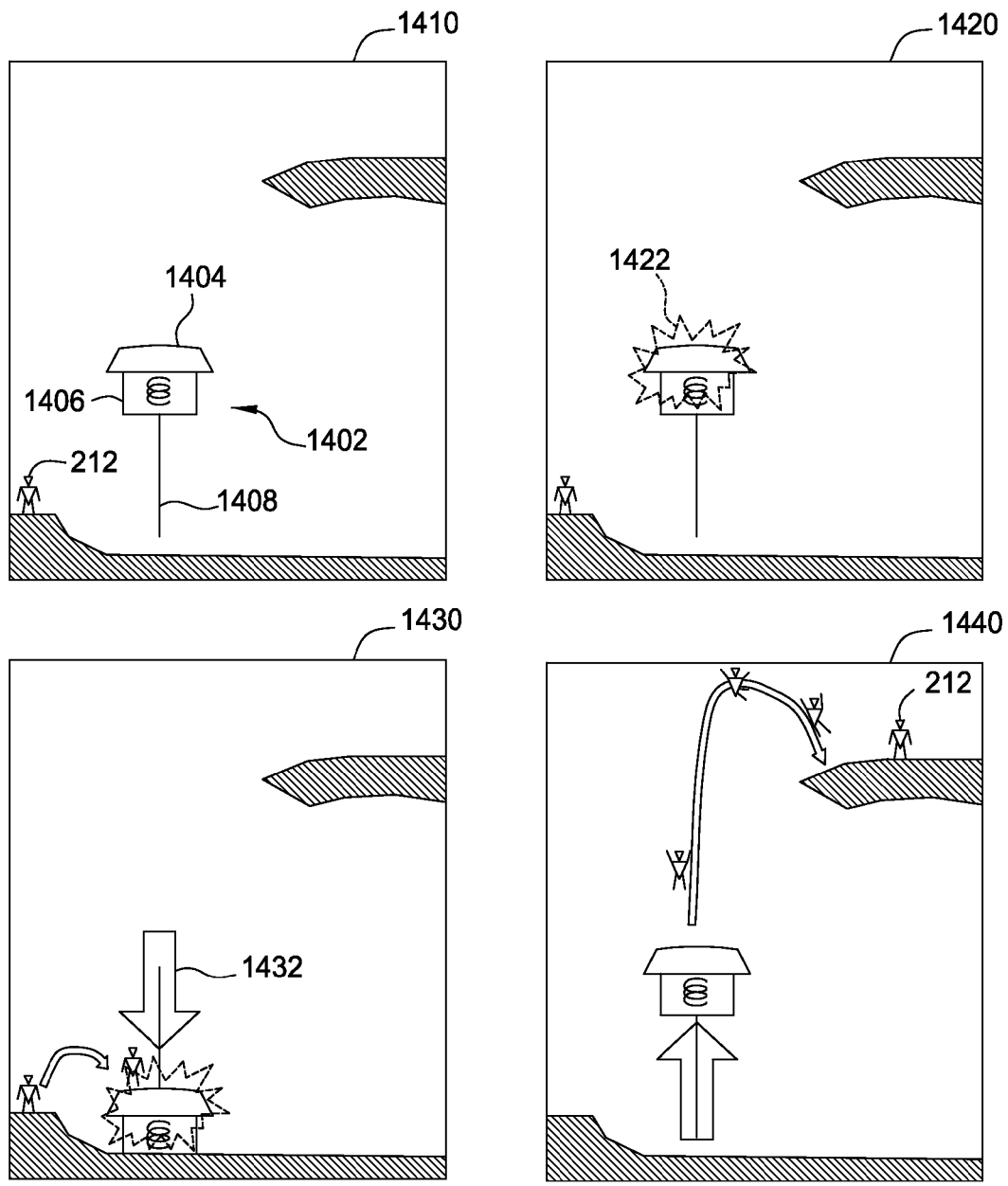
FIG. 14 is a sequential diagram illustrating an exemplary game level according to an embodiment of the invention.

In another embodiment, a pop-up element may be subject to an internal force that changes the position of the pop-up element. The internal force generally may be over-powered by manipulations by a user. For example, FIG. 14 illustrates a pop-up element 1402, after being displaced by a user, returning to its initial position (i.e., springing back) after the user has de-selected the pop-up element 1402. As shown, the pop-up element 1402 may include a platform 1404, a "spring" tab 1406 and an articulation groove 1408. The spring tab 1406 may have signage indicating the pop-up element 1402 may be subject to a spring-like force. In the example shown, the spring tab 1406 includes a "spring" icon. Turning to the sequence diagram illustrated in FIG. 14, at 1410, a game character 212 may seek to reach a high platform out of reach of a normal jump action. The platform 1404 is positioned towards the top of the articulation groove 1408. At 1420, the user may use the pointing controller to grasp the spring tab 1406 (as illustrated by a dashed star over the spring 1406.) At 1430, while grasping the spring tab 1406, the user may motion the pointing controller downwards to pull the platform 1404 downwards along the articulation groove 1408. While the platform 1404 is held down, the game character 212 may jump onto and board the platform 1404.

At 1440, the user may release their grasp of the spring tab 1406. With the user's manipulations no longer felt on the pop-up element 1402, an internal force of the pop-up element causes the platform 1404 to return to its initial position at the top of the articulation groove 1408. The internal force generally may mimic a property of physics and may be pre-determined for each pop-up element. In the example illustrated, the pop-up element 1402 is subject to a spring-like force which urges the platform 1404 upward. In one aspect, the amount of force asserted on the platform 1404 may be directly proportional to the distance by which the platform is displaced from its initial position (i.e., in physics terminology, its equilibrium position). As shown at 1440, when the user releases the spring tab 1406, the platform 1404 shoots upwards, launching the game character 212 to a high platform. One skilled in the art would recognize that different pop-up elements 1402 may be configured to have internal forces of different strengths (i.e., spring constants). One skilled in the art would further recognize that pop-up elements may be configured to be subject to other physical forces, including, but not limited to, gravitational forces, magnetic forces, and electrostatic forces.

Figure 15:
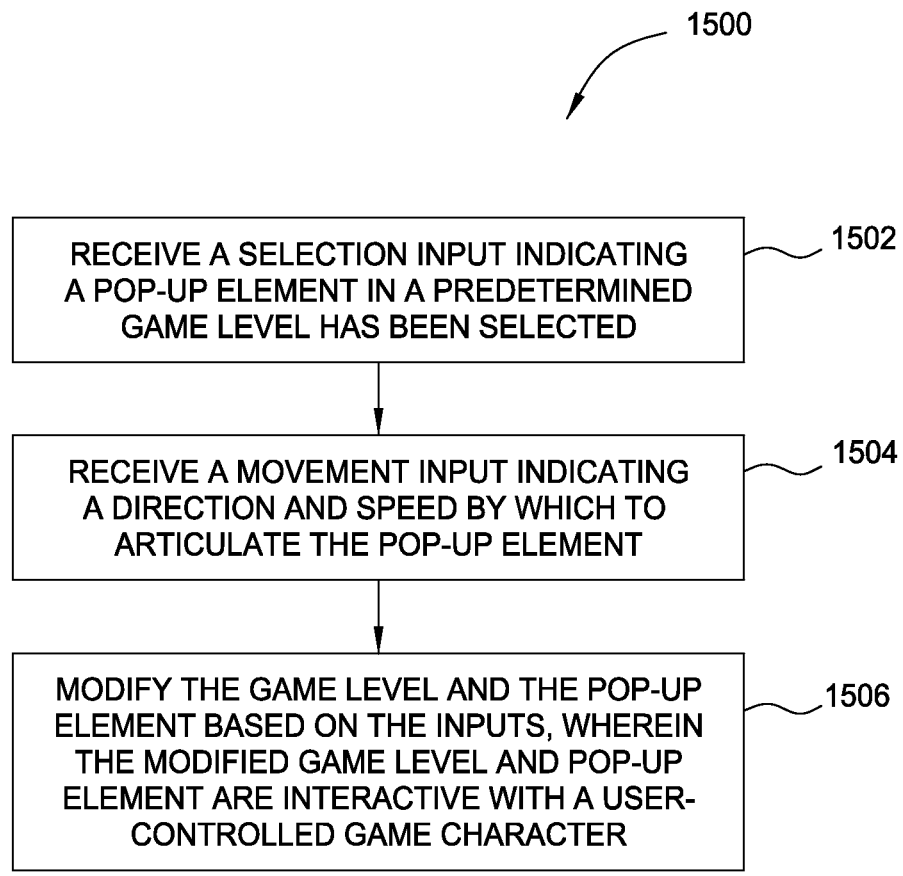
FIG. 15 is a flow diagram illustrating exemplary operations performed by a gaming program, according to an embodiment of the invention.

FIG. 15 is a flow diagram of exemplary operations that may be performed by a gaming program, according to an embodiment of the invention. The operations may begin in step 1502 by receiving a selection input indicating a pop-up element in a predetermined game level has been selected. In step 1504, a movement input may be received indicating a direction and speed by which to articulate the pop-up element. In step 1506, the gaming program may modify the game level and the pop-up element based on the inputs, wherein the modified game level and pop-up element are interactive with a user-controlled game character.

The aforementioned operations to be performed by a gaming program provides a platform gaming experience that advantageously provides an additional method of direct interaction with gaming elements with an improved user experience. While the foregoing is directed to embodiments of the present invention, other and further embodiments of the invention may be devised without departing from the basic scope thereof, and the scope thereof is determined by the claims that follow.

What is claimed is:

1. A computer implemented method for executing a video game, comprising:
    outputting for display a game level that includes a visual depiction of a pop-up element, the pop-up element comprising (i) a visual depiction of a platform element with which a user-controlled game character can interact and (ii) a visual depiction of a pop-up actuator exclusively configured to control movement of the platform element, wherein the game level visually depicts a predefined path along which the pop-up element can move in one or more directions, and wherein the visual depiction of the pop-up element is configured to move in one of the one or more directions along the predefined path responsive to a selection of the pop-up actuator and a predefined movement input;
    receiving selection input data via a handheld game controller identifying the pop-up actuator visually depicted within the game level;
    receiving movement input data via a handheld game controller indicating a direction and speed by which to articulate the pop-up element; and
    in response to a determination that the movement input described by the received data matches the predefined movement input and further based on the received selection input data identifying the pop-up actuator, rendering a sequence of frames, by operation of one or more computer processors, depicting the pop-up element moving along the predefined path in accordance with the direction and speed indicated by the movement input described by the received data, wherein the pop-up element moves along the predefined path at a rate that is dynamically determined based on the speed indicated by the movement input.

2. The method of claim 1, wherein the pop-up actuator comprises a tab coupled to the platform element, and further comprising:
    rendering a second sequence of frames depicting the platform element being disposed in a new location within the game level.

3. The method of claim 1, wherein the pop-up element comprises a flap, and further comprising:
    rendering a second sequence of frames depicting an item obscured by the flap being revealed.

4. The method of claim 1, wherein the pop-up element comprises a tab, and further comprising:
    rendering a second sequence of frames depicting a game element revealed via a shutter.

5. The method of claim 1, wherein the pop-up element comprises a flower circumscribed by a plurality of petal elements, the petal elements folded inward of the flower, and further comprising:
    rendering a second sequence of frames depicting the petal elements unfolding and revealing a teleportation gate.

6. The method of claim 1, wherein the pop-up element comprises an extendable element, and further comprising:
    rendering a second sequence of frames depicting the extendable element revealing a pathway within the game level.

7. The method of claim 1, wherein the pop-up element comprises a tab, and further comprising:
    rendering a second sequence of frames depicting a raised or lowered portion of the game level that is accessible by the game character.

8. The method of claim 1, wherein the pop-up element comprises a rotatable wheel, and wherein the pop-up element further comprises one or more platforms coupled to the rotatable wheel, and wherein, when the user input causes the character to rotate the wheel, doing so reveals one of a new location in the game level and one or more objects revealed by the rotation of the rotatable wheel.

9. The method of claim 1, further comprising:
in response to no longer receiving the selection input indicating the pop-up element has been selected, restoring the pop-up element to a state that existed prior to receiving the selection input.

10. A non-transitory computer-readable medium comprising a program product which, when executed, is configured to perform an operation to execute a video game, the operation comprising:
outputting for display a game level that includes a visual depiction of a pop-up element, the pop-up element comprising (i) a visual depiction of a platform element with which a user-controlled game character can interact and (ii) a visual depiction of a pop-up actuator exclusively configured to control movement of the platform element, wherein the game level visually depicts a predefined path along which the pop-up element can move in one or more directions, and wherein the visual depiction of the pop-up element is configured to move in one of the one or more directions along the predefined path responsive to a selection of the pop-up actuator and a predefined movement input;
receiving a selection input via a handheld game controller of the pop-up actuator visually depicted within the game level;
receiving data via a handheld game controller describing a movement input indicating a direction and speed by which to articulate the pop-up element; and
in response to a determination that the movement input described by the received data matches the predefined movement input and further based on the received selection input data identifying the pop-up actuator, rendering a sequence of frames, by operation of one or more computer processors, depicting the pop-up element moving along the predefined path in accordance with the direction and speed indicated by the movement input described by the received data, wherein the pop-up element moves along the predefined path at a rate that is dynamically determined based on the speed indicated by the movement input.

11. The non-transitory computer-readable medium of claim 10, wherein the pop-up actuator comprises a tab coupled to the platform element, and further comprising:
rendering a second sequence of frames depicting the platform element being disposed in a new location within the game level.

12. The non-transitory computer-readable medium of claim 10, wherein the pop-up element comprises a flap, and further comprising:
rendering a second sequence of frames depicting an item obscured by the flap being revealed.

13. The non-transitory computer-readable medium of claim 10, wherein the pop-up element comprises a tab, and further comprising:
rendering a second sequence of frames depicting a game element revealed via a shutter.

14. The non-transitory computer-readable medium of claim 10, wherein the pop-up element comprises a flower circumscribed by a plurality of petal elements, the petal elements folded inward of the flower, and further comprising:
rendering a second sequence of frames depicting the petal elements unfolding and revealing a teleportation gate.

15. The non-transitory computer-readable medium of claim 10, wherein the pop-up element comprises an extendable element, and further comprising:
rendering a second sequence of frames depicting the extendable element revealing a pathway within the game level.

16. The non-transitory computer-readable medium of claim 10, wherein the pop-up element comprises a tab, and further comprising:
rendering a second sequence of frames depicting a raised or lowered portion of the game level that is accessible by the game character.

17. The non-transitory computer-readable medium of claim 10, wherein the pop-up element comprises a rotatable wheel, and wherein the pop-up element further comprises one or more platforms coupled to the rotatable wheel, and wherein, when the user input causes the character to rotate the wheel, doing so reveals one of a new location in the game level and one or more objects revealed by the rotation of the rotatable wheel.

18. The non-transitory computer-readable medium of claim 10, wherein the operation further comprises:
in response to no longer receiving the selection input indicating the pop-up element has been selected, restoring the pop-up element to a state that existed prior to receiving the selection input.

19. A system, comprising:
a memory device storing video game; and
a processor which, when executing the video game, is configured to perform an operation comprising:
outputting for display a game level that includes a visual depiction of a pop-up element, the pop-up element comprising (i) a visual depiction of a platform element with which a user-controlled game character can interact and (ii) a visual depiction of a pop-up actuator exclusively configured to control movement of the platform element, wherein the game level visually depicts a predefined path along which the pop-up element can move in one or more directions, and wherein the visual depiction of the pop-up element is configured to move in one of the one or more directions along the predefined path responsive to a selection of the pop-up actuator and a predefined movement input;
receiving a selection input via a handheld game controller of the pop-up actuator visually depicted within the game level;
receiving data via a handheld game controller describing a movement input indicating a direction and speed by which to articulate the pop-up element; and
in response to a determination that the movement input described by the received data matches the predefined movement input and further based on the received selection input data identifying the pop-up actuator, rendering a sequence of frames, by operation of one or more computer processors, depicting the pop-up element moving along the predefined path in accordance with the direction and speed indicated by the movement input described by the received data, wherein the pop-up element moves along the predefined path at a rate that is dynamically determined based on the speed indicated by the movement input.

20. The system of claim 19, wherein the pop-up actuator comprises a tab coupled to the platform element, and further comprising:
   rendering a second sequence of frames depicting the platform element being disposed in a new location within the game level.

21. The system of claim 19, wherein the pop-up element comprises a flap, and further comprising:
   rendering a second sequence of frames depicting an item obscured by the flap being revealed.

22. The system of claim 19, wherein the pop-up element comprises a tab, and further comprising:
   rendering a second sequence of frames depicting a game element revealed via a shutter.

23. The system of claim 19, wherein the pop-up element comprises a flower circumscribed by a plurality of petal elements, the petal elements folded inward of the flower, and further comprising:
   rendering a second sequence of frames depicting the petal elements unfolding and revealing a teleportation gate.

24. The system of claim 19, wherein the pop-up element comprises an extendable element, and further comprising:
   rendering a second sequence of frames depicting the extendable element revealing a pathway within the game level.

25. The system of claim 19, wherein the pop-up element comprises a tab, and further comprising:
   rendering a second sequence of frames depicting a raised or lowered portion of the game level that is accessible by the game character.

26. The system of claim 19, wherein the pop-up element comprises a rotatable wheel, and wherein the pop-up element further comprises one or more platforms coupled to the rotatable wheel, and wherein, when the user input causes the character to rotate the wheel, doing so reveals one of a new location in the game level and one or more objects revealed by the rotation of the rotatable wheel.

27. The system of claim 19, wherein the operation further comprises:
   in response to no longer receiving the selection input indicating the pop-up element has been selected, restoring the pop-up element to a state that existed prior to receiving the selection input.

* * * * *